March 10, 1931.  W. C. SCHEU ET AL  1,795,511
FRUIT COUNTING APPARATUS
Filed Dec. 13, 1924   4 Sheets-Sheet 1

Inventors
William C. Scheu.
Joseph H. Hemmerly.
By Lyon+Lyon
Attorneys

March 10, 1931.    W. C. SCHEU ET AL    1,795,511
FRUIT COUNTING APPARATUS
Filed Dec. 13, 1924    4 Sheets-Sheet 2

Inventors
William C. Scheu
Joseph H. Hemmerly
By Lyon & Lyon Attorneys

March 10, 1931.    W. C. SCHEU ET AL    1,795,511
FRUIT COUNTING APPARATUS
Filed Dec. 13, 1924    4 Sheets-Sheet 4

Inventors:
William C. Scheu and
Joseph H. Hemmerly,
by Lyon + Lyon, Attys.

Patented Mar. 10, 1931

1,795,511

UNITED STATES PATENT OFFICE

WILLIAM C. SCHEU, OF UPLANDS, AND JOSEPH H. HEMMERLY, OF POMONA, CALIFORNIA, ASSIGNORS, BY DIRECT AND MESNE ASSIGNMENTS, TO SCHEU MANUFACTURING COMPANY, A CORPORATION OF CALIFORNIA

FRUIT-COUNTING APPARATUS

Application filed December 13, 1924. Serial No. 755,684.

This invention relates to fruit counting apparatus, and is more particularly directed to an apparatus for use in connection with fruit sizing apparatus for the counting of separate articles of fruit of each size under all conditions of operation of the sizing apparatus, and means for registering the number of articles of fruit of each size counted at a central point removed from the sizing apparatus.

Counting apparatus heretofore developed have been demonstrated to be impractical for use for counting fruit and particularly impractical for counting fruit delivered from fruit sizing apparatus. Among the difficulties encountered in so counting fruit is the inability of such counting apparatus to positively act on each and every fruit delivered from the sizing apparatus, which fruit has a slight variation in size; and that such counting apparatus heretofore developed offer a great resistance to the travel of the fruit from the sizing apparatus, and the fact that most of such counting apparatus damage the skin of the fruit passing therethrough. Other difficulties which have had to be overcome in such fruit counting apparatus are the development of a registering apparatus for use in connection with the trip or key of the counting apparatus that will operate positively and without fail on each and every contact of fruit with the trip or key, and which will be efficient in operation at a low speed of operation, as well as under the maximum operating conditions; as well as the development of a system for counting fruit and registering the count made for use in case of extreme rapidity of deliverance of fruit from any particular sizing unit that will positively count all of the articles of fruit passing therethrough without congesting the sizing apparatus; moreover, such fruit counting apparatus must be inexpensive in operation, maintenance, and of a relatively low initial installation cost, in order to be applicable for use.

Various objects and advantages of this invention will be apparent from the following detail description of a preferred embodiment thereof, as illustrated in the accompanying drawings.

Figure 7:
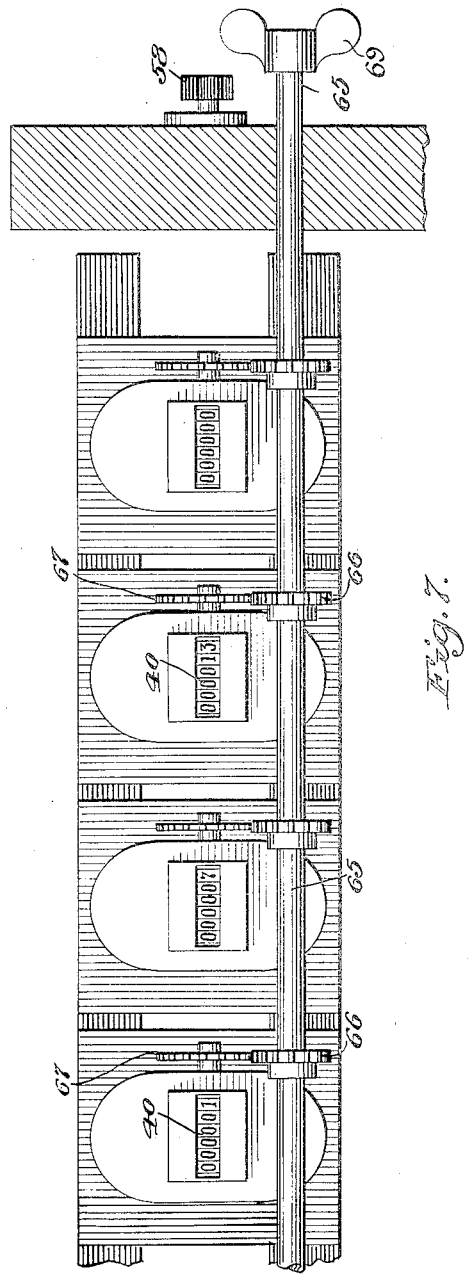

And Fig. 7 is a fragmentary view in side elevation illustrating the turn-back mechanism for a set of registers.

Referring to the drawings, 1 illustrates a trough along which the fruit to be sized is conveyed by any suitable means, such as the ropes 2 operating in conjunction with the rollers 3 to separate the fruit into respective sizes, the separation of the fruit in the respective sizes being illustrated in the drawings as attained through the distance of separation of the rollers 3 from the ropes or conveyors 2 it, however, being understood that this invention is not dependent upon any particular manner of sizing of the fruit. The fruit, dropping between the rope 2 and rollers 3, passes down an inclined runway 4 onto a belt 5 or other suitable conveyor, traveling preferably in a direction of travel of the conveyors 2.

Partitions 6, 7 and 8 of any suitable construction, are mounted upon a runway 4 to guide the fruit into contact with fruit counting keys or elements 9, two of which elements 9 are illustrated as positioned upon the belt 5 within the separate dividing partitions 6 which belt is used to propel the sized fruit into the proper bins 10. The counting elements 9 and 9ª are mounted on elevated transverse supports 11, and the fruit is guided into contact with the units 9 by means of spaced guides 12 and 13. The upper counting element 9ª is what is termed the auxiliary or overload counting element, and is one used in case the fruit delivered of a particular size is of such quantity as to overcrowd the lower counting unit 9 so that the sizing system might become congested, in which case a gate 14 illustrated as closed at 15 is swung upward to a position illustrated at 16 so that the fruit may pass through the upper or auxiliary counting element 9ª it, however, being understood that any number of counting units 9 and 9ª may be employed for the counting of the fruit of any particular size, as the conditions of delivery thereto may warrant.

The gate 14 is hinged as illustrated at 17 and is adapted to be lowered upon the edges of the dividing members 12 and 8, which members 12 and 8 are tapered to a point at 18 to allow the gate 14 to be lowered into approximate engagement with the conveyor 5. The counting elements 9 comprise a frame 19 preferably of light material, such as aluminum, which frame 19 is pivoted to the offset support 20 by a pin 21 so that the same will be free to swing vertically so as to be raised or lowered as the size of the fruit passing thereunder necessitates. Stops 22 and 23 are provided in connection with the end 24 of the support 20 to limit the vertical movement of the frame 19.

Mounted on a pin 25 is an impact member such as star wheel 26, which star wheel has a plurality of angularly spaced points or projections connected by curved surfaces 27 of approximately the same diameter as that of the fruit to be counted. Mounted on one end of the star wheel 26 is a contact actuating element 28 having a plurality of raised points 29 and flat or relatively depressed surfaces 30 corresponding to the projections and curved surfaces of the star wheel.

Mounted on the frame 19 on the extensions 31 and 32 thereof are contact keys or spring contact means 33 and 34, the contact key 34 being insulated from the frame 19 by means of any suitable insulation, said extension 32 being for example constructed of insulating material. The contact key 33 is adapted to be engaged by the raised portion 29 of the element 28 when the star wheel 26 is caused to rotate by fruit engaging one of the curved surfaces 27, and the contact 33 at other times resting upon the flat surface 30 to resist to a slight degree the revolutions of the star wheel 26 and limit or define the extent of each rotative movement thereof.

It will be apparent that when the contact key 33 is forced upward upon one of the raised portions 29, that the contact point 36 of the contact key 33 will be engaged with a contact point 37 of the contact key 34, and an electric circuit (hereinafter described) will be completed.

In order that the counting element 9 may be regulated in position in relation to the surface of the conveyor 5; the offset support 20 is slotted as at 38 to receive bolts or screws 39, which bolts or screws are adapted to secure the counting element 9 to the transverse support 11.

It is preferable that the entire construction of the counting elements 9 and 9ª that are mounted on the pin 21 be of the lightest possible construction and that the resistance offered to the rotation of the star wheel 26 be such that the resistance offered to the travel of the fruit under the counting element 9 to turn the star wheel 26 be of such a slight degree that the fruit so engaging the star wheel 26 will not be damaged by such contact. It is also important that the star wheel 26 be so constructed that one fruit will cause only one contact of the contact keys 33 and 34, and this is accomplished in the preferred construction herein illustrated by the formation on the star wheel 26 of the particular number and shape of the engaging surfaces 27 and by the flat surfaces 30 on actuating element 28 operating in conjunction with the resisting spring contact member 33 to limit each rotative movement of the star wheel, as heretofore set forth. The support 20 is offset so that the counting elements 9 may be secured directly to the transverse supporting members 11 and that the same will be in an inclined position upon the traveling belt or conveyor 5 and will extend obliquely with reference to the direction of motion of said belt and substantially in the direction of travel of the fruit under the combined action of gravity and of the movement of the belt, so that the force exerted by the fruit under such combined action of gravity and of the movement of the belt will act in the most advantageous direction to turn the star wheel 26 to effect the counting of the fruit. It will be understood, in this connection, that the conveyor belts 5 are laterally inclined downwardly toward the bins 10 in the usual manner of such apparatus so that the force of gravity imparts a lateral component to the direction of travel of the fruit on the belt, and it is for the purpose of compensating for this lateral motion that we have so mounted the counting element that the frame 19 of each such element swings in a substantially vertical plane inclined to the direction of travel of the belt. The ability of the frame 19 to swing upwardly or downwardly, as the size of the fruit passing therethrough varies somewhat, is also of particular advantage as it insures that even when a series of pieces of fruit of varying sizes pass in close succession beneath the counting element, each fruit will be caused to positively engage a projection of the star wheel and rotate the same through the required angle to effect operation of the registering means.

Current is supplied for the actuating of magnetic registers illustrated at 40 and 41 by means of a motor generator illustrated at 42, the current leads 43 and 44 of which are connected to a double throw switch 45 so that the direction of flow of current from the direct current generator may be reversed so that the wear upon the contact points 36 and 37 will be equal. Leaving the double throw switch 45, the lead 43 is connected through the auxiliary leads 46 to the separate counting elements 9, so that the said elements 9 are connected in parallel. The other lead 44 is connected by means of the cross leads 47 to the auxiliary magnetic registers illustrated at 41, and by the cross leads 49 to the regular magnetic registers illustrated at 40. The opposite lead 51 from each regular register 40 is connected directly to the opposite contact key (either 33 or 34) of the regular counting elements 9, one of which regular registers 40 is employed for each regular counting element 9. The lead 52 from each auxiliary counter 9$^a$ is connected to a multiple throw switch 53. The cross lead 47 is connected to one terminal of the auxiliary magnetic register 41, the other terminal of the auxiliary magnetic register 41 being connected to the central terminal of the multiple throw switch 53.

Figure 4:
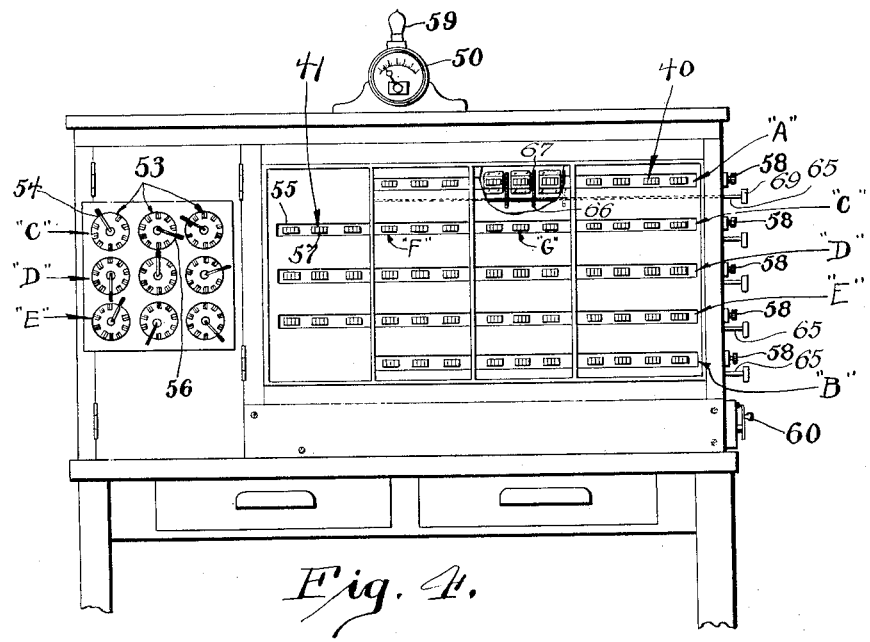
Fig. 4 is a front elevation of the assembly of registering devices embodying this invention.
Figure 2:
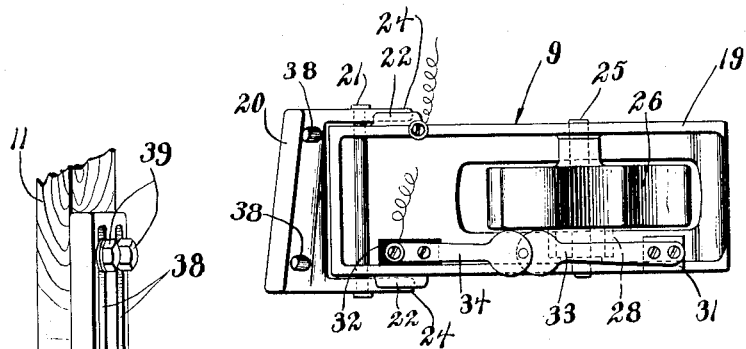
Fig. 2 is a plan view of one of the counting means illustrated in Fig. 1.

In Figure 4 is illustrated a counting board for use in a packing house where five different grades of fruit are being sized, counted and packed.

The grades A and B are illustrated as employing no auxiliary registers 41 or counting elements 9$^a$, while the grades C, D and E are illustrated as employing auxiliary registers 41 operative in conjunction with auxiliary counting elements 9$^a$, three of which auxiliary registers 41 are illustrated for counting the overload sizes of each grade C, D and E.

Figure 1:
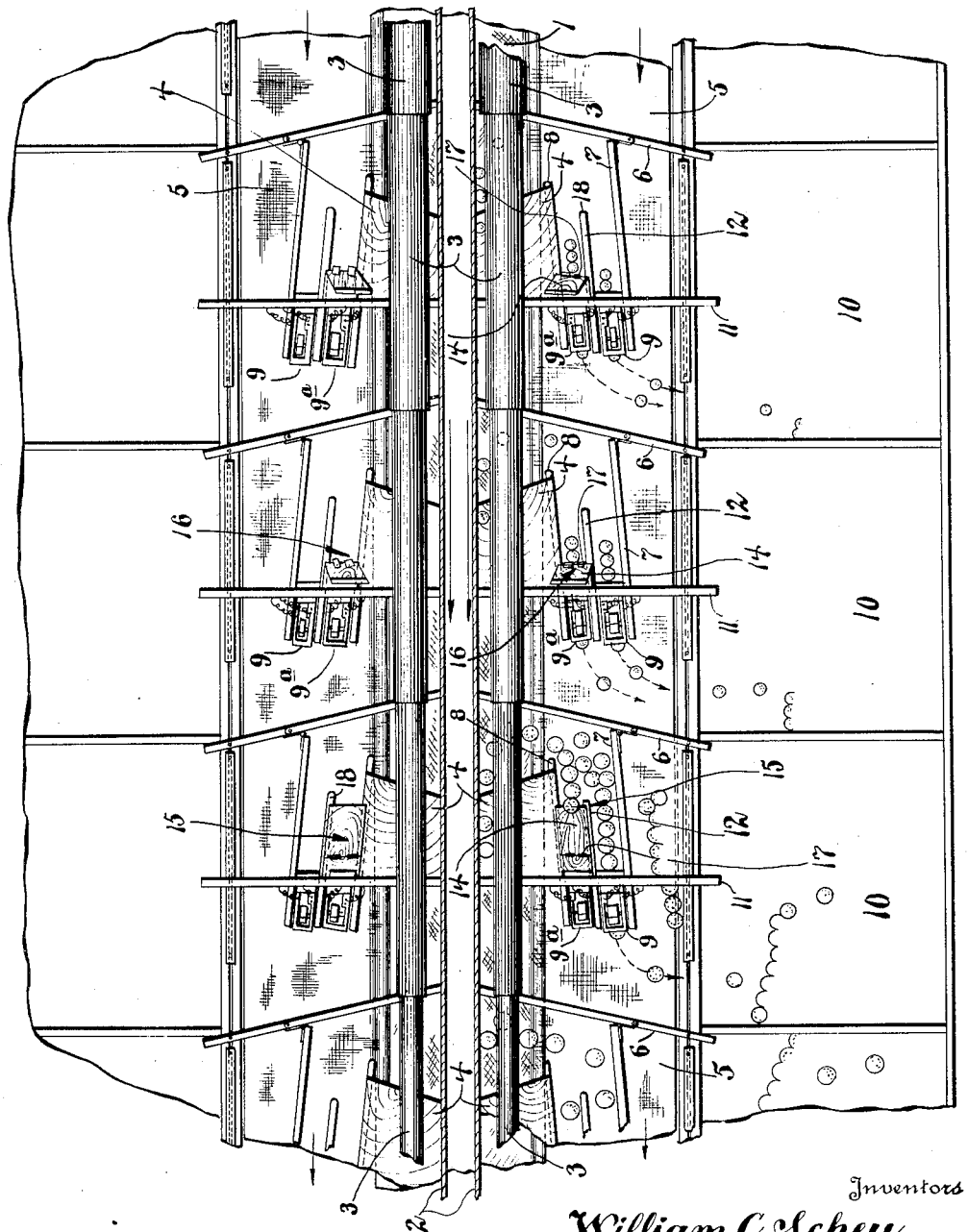
Fig. 1 is a fragmental plan view of a fruit dispensing machine illustrating counting units or keys embodying this invention, as adapted to the fruit sizing machine delivering troughs.

The particular packing house for which the above described counting board was designed sizes the fruit into ten different sizes, which is illustrated by the use of ten separate registers 40 for each grade of fruit packed therein. There are therefore twenty regular counting elements 9, there being in this preferred illustration two of such regular counting elements 9 for each size of fruit separated, as may be seen in Figure 1, and there are twenty auxiliary counting elements 9$^a$ for each of the grades C, D and E, each of which auxiliary counting elements 9 is connected to one terminal of each of the three multiple throw switches 53 illustrated for use in connection with each grade C, D, and E, the number of outer terminals of the multiple throw switches 53 corresponding to the number of sizes of fruit separated in the particular sizing machine illustrated, and therefore, when one particular size of any one grade C, D or E which is illustrated at F (Figure 4) becomes overloaded, due to the presence of an unusually large quantity of fruit of that size in that particular shipment of fruit received from the grower, the auxiliary counting elements 9$^a$ corresponding to that size will be put into place by raising the cover 14. The multiple throw switch will be thrown to the contact corresponding to that size, which may be the contact 54, and which contact 54 is connected to the auxiliary register 55 so that each of the registers illustrated at F and at 55 will count that particular size of fruit passing through the sizing machine. Should another particular size of fruit be in large quantity in that particular shipment of fruit, such as a size that would correspond to that normally registered at the register G, the second multiple throw switch will be thrown to that contact illustrated at 56, and the register 57 will thereby be thrown into operation to count that particular size of fruit, together with the register illustrated at G, and so on, as conditions necessitate, each multiple throw switch may be turned to its correct position and the auxiliary registers 41 all put in use, or only those that are required. Should it develop that grades A and B require the use of auxiliary counting elements, it would be necessary only to duplicate the connections illustrated in connection with the grades C, D and E.

Switches 58 are situated at the end of the counting board and connected in any one of the leads leading to the registers 40 so that the current may be cut off from any particular set of registers 40 when the sizing machine used in sizing fruit of that particular grade is not in operation, or is in need of repair. Means are also provided, as shown in Fig. 7 for turning back the registers 40 and 41 when any particular shipment of fruit has been entirely sized and counted, which means comprise a shaft 65 mounted adjacent the registers 40 and 41 and having an operating handle 69 and being operatively connected with each register by means of a pinion 66 mounted on the shaft 65 to engage the turn back gear 67 of the register. The turn back mechanism within the register itself is of a well-known type and need not be illustrated or described in detail here. In the particular type now in use the registers are all turned forward to a zero reading when the counting of the particular shipment or allotment of fruit is completed.

Figures 3, 6:
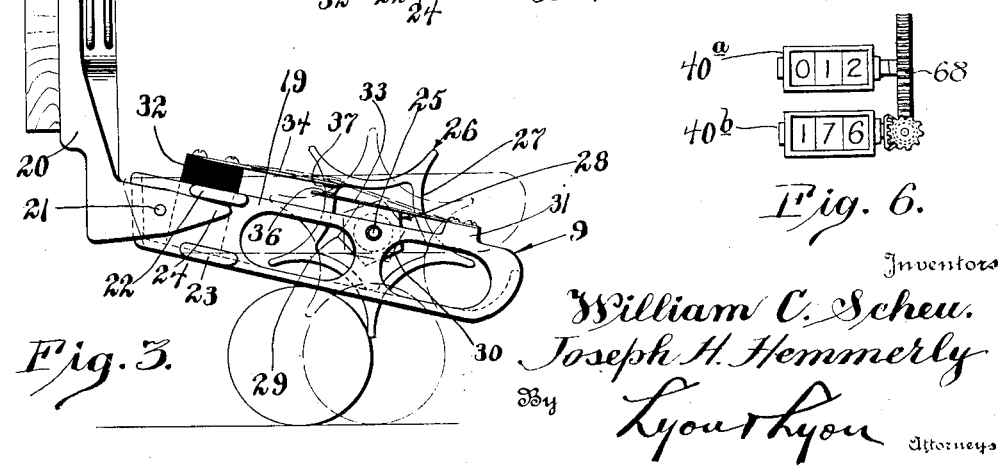
Fig. 3 is a side elevation of the counting unit illustrated in Fig. 2, illustrating fruit about to be contacted with the counting unit, shown in full lines, and illustrating the fruit passing under the contacting unit, in dotted lines.
Fig. 6 is a plan view of a register adapted to register the fruit counted in boxes and fractions of boxes or single units of fruit over a box embodied in this invention.
Figure 5:
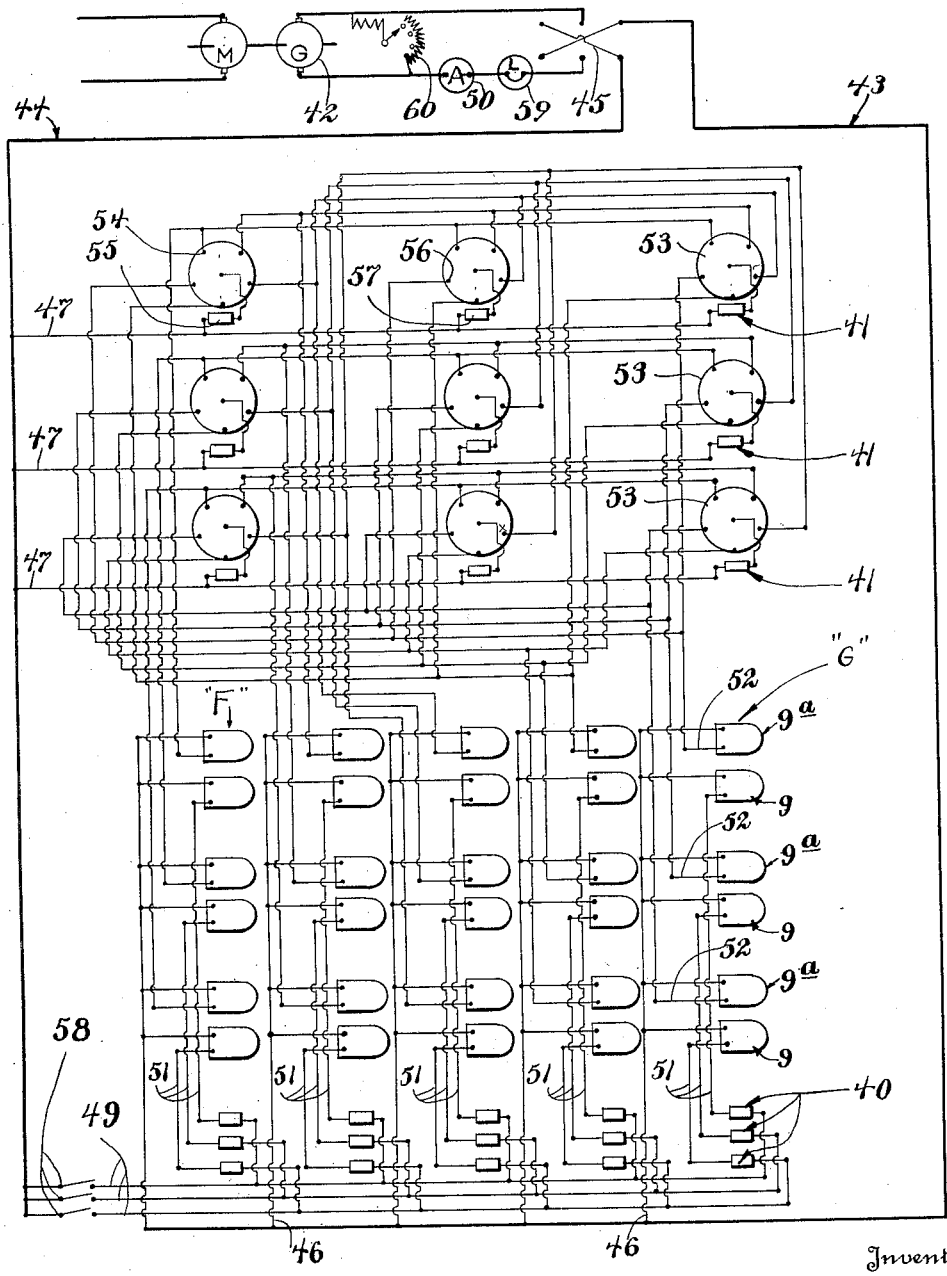
Fig. 5 is a diagram of electrical connections embodied in this invention.

In Fig. 6 is shown a pair of registering units 40$^a$ and 40$^b$, the register 40$^a$ being connected to the register 40$^b$ by means of worm or reducing gears 68 so that the register 40$^b$ will actuate the register 40ª when a certain number of fruit is registered on the register 40ᵇ, at which time it is preferable that the register 40ᵇ return to the zero reading so that the two registers 40ª and 40ᵇ will register the number of boxes of fruit counted and the separate fruit composing a portion of a box, at any time. For example, take the size 176, which corresponds to 176 separate articles of fruit to the ordinary packing box as used for packing oranges; the register 40ᵇ will register the separate articles of fruit up to 176, and will then actuate the register 40ª so as to register one box and at the finish of the counting of the fruit of that particular shipment the register 40ª will have registered a certain number of boxes of fruit, and the register 40ᵇ a certain number of fruit less than 176.

In order that the operator may be certain that the current is being separately supplied from the motor generator 42 to the counting system, an ammeter 50 is connected in series with leads 43 and 44, and a lamp or similar indicating device 59 is also mounted in series with the leads 43 or 44 to indicate the flow of current through the system; connected in series in the shunt field of the generator is a rheostat 60 for maintaining the required current in the circuit to operate the registers.

Having fully described the preferred embodiment of this invention, it is to be understood that it is not intended that this invention should be limited to the exact preferred consruction set forth, which may obviously be varied without departing from the spirit of the appended claims.

We claim:—

1. A fruit counting element comprising means rotatable upon engagement of fruit therewith and provided with an actuating element having a plurality of projections and a plurality of detent surfaces between adjacent projections, and register controlling means comprising a movable member normally resting upon one of said detent surfaces of said actuating element and being operable to registering position by movement of one of said projections therebeneath upon rotative movement of said rotatable means, said movable member being resiliently held inwardly toward said actuating element, whereby said movable member resiliently resists and determines the extent of each rotative movement of said rotatable means.

2. A fruit counting element comprising a support, a frame pivotally mounted on said support so as to swing vertically, and a register-controlling star wheel rotatably mounted on said frame.

3. In combination with fruit conveying means, a frame mounted adjacent said conveying means, said frame being biased toward said conveying means but being supported in such manner as to permit movement thereof toward or away from said conveying means, stop means limiting movement of said frame toward said conveying means, and a register-controlling member rotatably mounted on said frame and having a plurality of angularly spaced projections and adapted to be rotated through successive angular movements in the same direction to cause successive registering operations by engagement of fruit moved by said conveying means with successive projections thereof.

4. In apparatus for counting fruit, the combination of a rotatable register-controlling member having a plurality of angularly spaced projections and adapted for rotation by engagement of fruit with said projections, means for causing fruit to move in close succession in a path to successively engage said projections of the register controlling member and cause definite register-controlling rotative movement thereof by passage of each fruit, a support, means mounting said member on said support so as to permit rotation of said member and to also permit movement thereof toward or away from the fruit moving in said path, and means tending to hold said member toward the fruit.

5. In combination with means for conveying fruit, said fruit conveying means being laterally inclined downwardly in one direction so as to cause fruit thereon to travel in a direction inclined to the direction of travel of the conveying means, due to the combined action of gravity and the motion of the conveying means, a fruit counting device mounted above said conveying means and comprising a pivotally supported member so mounted as to swing in a vertical plane inclined to the direction of travel of the conveying means and substantially parallel to the direction of travel of the fruit on said conveying means, a register-controlling member mounted on said pivotally supported member so as to permit rotation of said register controlling member in said vertical plane substantially parallel to the direction of travel of the fruit and having a plurality of angularly spaced projections and adapted to be rotated to cause successive registering operations by engagement with said projections of fruit traveling on said conveying means.

Signed at Los Angeles Calif., this 1st day of December, 1924.

WILLIAM C. SCHEU.
JOSEPH H. HEMMERLY.